2,977,387

DIPENTABORYLALKANES AND METHOD FOR PREPARATION THEREOF

Jack R. Gould and John E. Paustian, Morristown, N.J., assignors, by mesne assignments, to Thiokol Chemical Corporation, a corporation of Delaware No Drawing. Filed Sept. 28, 1955, Ser. No. 537,288

6 Claims. (Cl. 260—606.5)

This invention relates to novel compositions of matter and to a process for producing them. More particularly, it relates to dipentaboryl alkanes having the formula $(B_5H_8)_2C_nH_{2n}$ in which $n$ is four to six. This invention also relates to the process of preparing dipentaboryl alkanes which comprises heating mixtures of two or more molecular proportions of pentaborane-9 with a conjugated alkadiene under autogeneous pressures in a temperature range of 100 to 175° C. in the absence of added catalysts.

Suitable conjugated dienes for use according to the present invention contain four to six carbon atoms and include particularly 1,3-butadiene, 2-methyl-1,3-butadiene, 1,3-pentadiene, 2-ethyl-1,3-butadiene and 2-methyl-1,3-pentadiene.

At least two molar proportions of pentaborane-9 are mixed with one molar proportion of the conjugated diene and heated under autogenous pressure to a temperature in the range of about 100 to 175° C. for about 3 to 10 hours or more. While the reaction is being carried out, the pressure will generally be within the range from about 150 p.s.i.g. to about 200 p.s.i.g. Somewhat shorter times may be sufficient but in some cases longer times may be desirable for improved yields. For maximum conversion, the proportion of pentaborane should not be less than 2 molecular proportions but it is advantageous to use larger amounts, preferably about 2 to 10 molar proportions or more of pentaborane to one of conjugated diene. The use of greater proportions of pentaborane than about 20 molar proportions to one of conjugated diene does not appear to improve the yield and required recovery and recycle of an expensive reactant.

Within the useful temperature range of about 100 to 175° C., the preferred temperature range is about 135 to 145° C. which appears to give satisfactory conversions without thermal decomposition of the reactants or products.

The dipentaboryl alkanes are suitably recovered from the reaction mixture by fractional distillation of the liquid products of the reaction, the desired product having a considerably higher boiling point than either of the reactants. The fractionation and other manipulations of the reaction mixture are carried out in the absence of air or oxygen.

The products are useful as fuels, fuel additives and chemical intermediates.

*Example I*

A mixture of 63 g. (1.0 mole) of pentaborane-9 was introduced as a liquid together with 18 g. (0.32 mole) of 1,3-butadiene as a liquid at room temperature into a stainless steel autoclave, which had a capacity of 250 ml. and which had previously been evacuated. The autoclave was sealed at room temperature and heated to 135 to 145° C. for a period of 8.5 hours. The autoclave and its contents were cooled to room temperature and the liquid residue and the gaseous products were vented. The liquid residue was transferred in the absence of air to a flask and weighed. The contents of the flask were distilled at atmospheric pressure to recover 51 g. (0.81 mole) of pentaborane. The residue was distilled under reduced pressure and the fraction boiling at 70 to 80° C. at 0.2 to 0.5 mm. Hg was collected.

The infrared spectrum of this liquid showed only monosubstituted pentaborane radicals and no indication of unsaturation. Elemental analysis gave 55.9 percent boron compared with 60 percent for the theoretical boron content of dipentaborylbutane. The molecular weight cryoscopically, was found to be 204, compared with a calculated value of 181 for $(B_5H_8)_2C_4H_8$.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the liquid product containing 55.9 percent of boron produced as described in Example I, this local fuel to air ratio by weight is approximately 0.072. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system beacuse of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these extreme conditions of altitude operations with conventional aircraft fuels.

The burning characteristics of the products of our invention are such as to make them useful in attaining good combustion performance even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of our invention eliminates the need of flame holding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention are useful in improving the combustion process of the ramjet in much the same manner as that described for the afterburner because of their improved chemical reactivity over that of simple hydrocarbon fuels. When employed in a ramjet the fuels of our invention will be simply substituted for hydrocarbon fuels and used in the established manner.

We claim:
1. Dipentaborylalkanes having the formula

$$(B_5H_8)_2C_nH_{2n}$$

in which $n$ is an integer from 4 to 6.
2. The compound of claim 1 wherein $n$ is 4.
3. A method for the preparation of liquid borohydrocarbons which are useful as fuels which comprises reacting one mole of a conjugated alkadiene hydrocarbon having from 4 to 6 carbon atoms and from 2 to 20 moles of pentaborane-9 at a temperature within the range from 100° C. to 175° C. and at a pressure within the range from 150 p.s.i.g. to 200 p.s.i.g.
4. The method of claim 3 wherein the reaction temperature is 135° C. to 145° C.
5. The method of claim 3 wherein the conjugated alkadiene is 1,3-butadiene.
6. The method of claim 5 wherein the reaction temperature is 135° C. to 145° C.

No references cited.